Sept. 18, 1962

T. P. BOTHWELL 3,054,910

VOLTAGE COMPARATOR INDICATING TWO INPUT SIGNALS EQUAL
EMPLOYING CONSTANT CURRENT SOURCE
AND BISTABLE TRIGGER

Filed May 27, 1959

INVENTOR.
Theodore Paul Bothwell
BY
*Joseph Weingarten*
ATTORNEY

United States Patent Office 3,054,910
Patented Sept. 18, 1962

3,054,910
VOLTAGE COMPARATOR INDICATING TWO INPUT SIGNALS EQUAL EMPLOYING CONSTANT CURRENT SOURCE AND BISTABLE TRIGGER
Theodore Paul Bothwell, Watertown, Mass., assignor to EPSCO, Incorporated, Boston, Mass., a corporation of Massachusetts
Filed May 27, 1959, Ser. No. 816,330
4 Claims. (Cl. 307—88.5)

This invention relates generally to an electronic device for comparing the amplitudes of electrical signals and more particularly pertains to a highly sensitive voltage comparison circuit for determining the time at which two electrical signals attain a predetermined voltage.

Electronic devices are known for comparing two electrical signals and providing an output signal indicative of the time when the compared signals are equal in voltage. Those devices are generically termed "voltage comparators." A voltage comparator is a type of non-linear circuit employed to ascertain the exact time at which an input signal, which may be an arbitrary waveform, attains a reference voltage level. The distinction between voltage comparator circuits and voltage-selection or clipping circuits is that in a comparator circuit the reproduction of any part of the input signal waveform is not an objective. Frequently, the output of a comparator circuit is a large amplitude, short-duration pulse, whatever the input signal waveform may be, which occurs at the instant the input signal voltage amplitude reaches the reference voltage and is otherwise independent of the input signal. Voltage comparators are extensively used for timing purposes in radar systems and are also extensively used for converting analog information to digital form in data processing machines.

Conventional voltage comparator devices are limited in utility because of a lack of sensitivity and a tendency toward instability manifested by jitter. Jitter is caused by the failure of those electronic devices to respond consistently to the occurrence of the voltage equality condition of the compared signals. For example, such a device may respond when the two signals are within 40 millivolts of equality and at a later time respond when the two signals are within 25 millivolts of equality. That is, the device may respond at any time when the compared signals are within 40 to 25 millivolts of equality with the result that where the condition of signal equality is periodically repeated, the output of the device is not periodic but rather is aperiodic and, in effect, jitters about the periodic value.

Electronic voltage comparator devices which provide an output indicative of the time when two electrical signals are equal in voltage are employed in digital voltmeters. The term digital voltmeter designates an instrument for measuring the voltage of an electrical signal and displaying the numerical value of the measured signal, not by means of the customary pointer and calibrated scale, but rather, by directly presenting the numerical digits either visually in a window of the instrument, or electrically at designated output terminals. In principle, the digital voltmeter operates by counting the number of cycles of oscillation of a stable oscillator which occurs between the time that a repetitively generated signal attains a reference voltage level and the time the generated signal becomes equal to the voltage of the measured signal. Jitter introduced by the electronic device for determining the time of voltage equality of the generated and measured signals is manifestly undesirable since it causes the last decimal digit in the numerical value presented by the digital voltmeter to fluctuate rapidly.

It is an object of the invention to provide an improved electronic device for comparing two electrical signals and generating an output signal indicative of the time of voltage equality of the compared signals.

Another object of the invention is to provide an electronic voltage comparison device that is highly sensitive to a small difference in voltage between compared signals and is capable of amplifying the differential voltage to obtain an improvement of comparison accuracy.

A further object of the invention is to provide an electronic voltage comparison device which has a high degree of stability, that is, freedom from jitter and the effect of voltage drift, coupled with sensitivity to very small differences in voltage between compared signals.

A subsidiary object of the invention is to provide electronic voltage comparison apparatus exclusively employing solid state amplifying and switching devices arranged in a manner causing the leakage currents through those devices to offset one another.

The invention resides in a comparator amplifier which determines with a high degree of accuracy the time when two electrical signals become equal in voltage and generates an output signal having a definition of time of equality to better than one microsecond. The comparator amplifier employs transistors arranged so that the effects of leakage currents in certain of the transistors are offset by the leakage currents in other of the transistors. Inherent advantages of the invention are that matching of the characteristics of the transistors is unnecessary and the effect of voltage drift is minimized by the differential amplification obtaining throughout the device.

More specifically, the invention contemplates arranging a pair of transistors and a constant current generator to cause the constant current to flow through one of the transistors when the two electrical signals are unequal and to cause half the constant current to be diverted into the other transistor when the two signals are substantially equal in voltage. Where, for example, the two input signals are within one millivolt of equality, one-half of the constant current is diverted to the other transistor. The diversion of current due to this small difference in voltages results in an amplification of the differential voltage, that is, a drop in voltage ensues across the load impedance of one transistor and a corresponding rise in voltage occurs at the load impedance of the other transistor so that the small difference in input signal voltages is magnified as a difference in voltage drops across the load impedances of the transistors. A trigger circuit formed by a second pair of transistors is provided, the trigger circuit having an initial state in which one of the transistors is conducting in saturation and the other transistor is cut off. The trigger circuit is directly coupled to the first pair of transistors and is caused by the amplified differential voltage to change to a second state in which the condition of the second pair of transistors is reversed. Positive feedback or regeneration is incorporated in the trigger circuit to cause that circuit to switch more rapidly from its initial state to its second state.

The arrangement, construction, and operation of the invention can be more fully understood by reference to the following detailed description when considered in conjunction with the appended drawings wherein.

Figure 1:
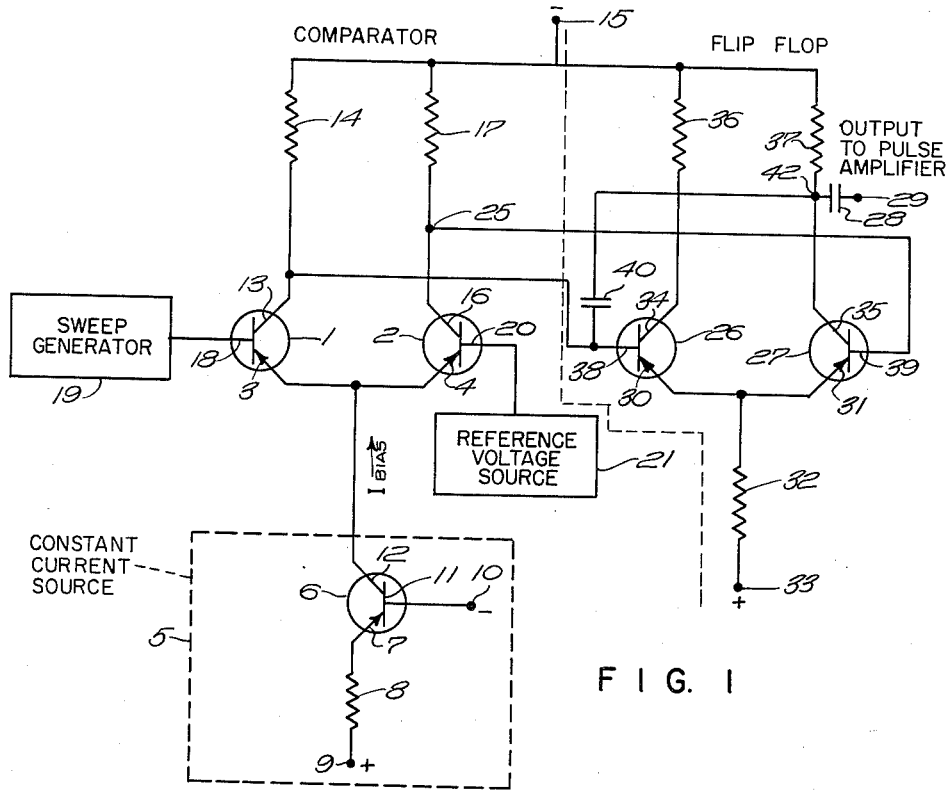
FIG. 1 illustrates in schematic form a preferred embodiment of the invention.
Figure 2A:
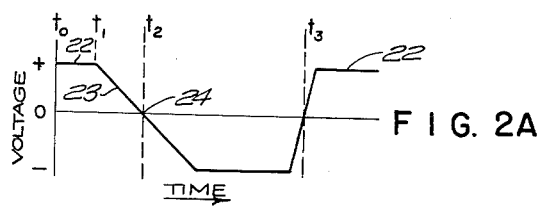
FIG. 2A represents the output signal of the sweep generator plotted along a time axis.

Referring to FIG. 1, there is shown in schematic form a preferred embodiment of the invention employing solid state devices, in this case P-N-P transistors, for carrying forward the purpose of the invention. The first stage of the device includes two transistors 1, 2, having their respective emitters 3, 4 connected together and to a constant current generator 5. The constant current generator may be any source whose internal impedance is high compared to the impedance of its load. In this embodiment, the apparatus within the block 5, by way of example, is a transistor 6 having its emitter 7 connected through a resistor 8 to a source of positive potential impressed at terminal 9. A bias voltage is impressed at terminal 10 on the base 11 of transistor 6, the bias voltage being of such polarity as to forwardly bias transistor 6 so that a current $I_{BIAS}$ flows to the collector 12. The collector 13 of transistor 1 is connected through load resistor 14 to a terminal 15 at which a negative potential is impressed to bias the collector in the reverse direction. In like manner, the collector 16 of transistor 2 is connected through load resistor 17 to terminal 15 whereby to reversely bias that collector. The base 18 of transistor 1 is connected to the output of a sweep generator 19. Base 20 of transistor 2 is connected to a reference voltage source 21 which may be ground, or a stable voltage level above or below ground. The output signal of the sweep generator is the ramp voltage, shown in FIG. 2A. The upper level 22 of the signal is sufficiently positive with respect to the reference voltage impressed on base 20 to cause transistor 1 to be cut-off so that the current $I_{BIAS}$ supplied by the constant current generator is compelled to flow through transistor 2. The initial state of this circuit is then, that the signal from sweep generator 19 holds transistor 1 cut-off and the entire current $I_{BIAS}$ from the constant current generator flows through transistor 2. As time $t_1$, shown in FIG. 2A, the voltage of the generator sweep signal commences to decrease at a constant rate along the ramp 23 and at time $t_2$ the voltage at point 24 on the ramp becomes equal to the reference voltage, the reference voltage being assumed to be at the zero or ground potential for ease of exposition. At this time the ramp voltage equals or is very nearly equal (within one millivolt) to the reference voltage and both transistors are forwardly biased to the same extent, so that the current $I_{BIAS}$, from the constant current generator 5 divides equally, half of the current flowing through transistor 1 and the other half flowing through transistor 2. As the ramp voltage continues to drop, the entire current flows through transistor 1 and transistor 2 is cut-off. The first stage remains in this state until time $t_3$ when the ramp voltage is being returned to its maximum positive voltage.

With regard to the magnitude of the $I_{BIAS}$ current, this current is chosen to be as small as possible consistent with the requirement that it be large compared with collector diode leakage current. That is, the $I_{BIAS}$ current should be in the order of forty or fifty times larger than the collector diode leakage current. Thus, if the collector diode leakage current is 5 microamperes, $I_{BIAS}$ should be in the order of 200 microamperes. The $I_{BIAS}$ current is chosen to be small because it is important to minimize the heat required to be dissipated by transistors 1 and 2. This follows from the fact that the base-emitter junction bias voltage is dependent upon temperature to the extent that a change in temperature of one degree centigrade causes a change in bias voltage of approximately two millivolts. Any change, due to temperature, in bias voltage at the base-emitter junction of one of the transistors 1, 2, which does not simultaneously effect an equal change in bias voltage at the other of those transistors, causes an impairment in the accuracy of circuit performance. It is, therefore, a desideratum that the heat dissipation requirements imposed upon transistors 1 and 2 be held to a minimum. However, the effective voltage gain of the first stage is approximately proportional to the magnitude of the $I_{BIAS}$ current, and it is desirable to have appreciable gain in the first stage in order to amplify the initially small differential voltage. Therefore, the $I_{BIAS}$ current must be a compromise between the necessity for using a small current to minimize the heat dissipation of the transistors and the desire to increase the voltage gain by increasing the $I_{BIAS}$ current.

Figure 2B:
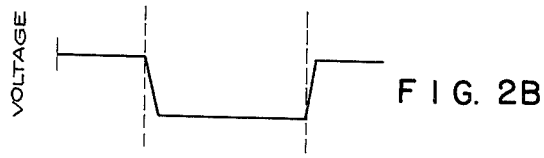
FIG. 2B is a waveform derived at junction 25 of FIG. 1.
Figure 2C:
FIG. 2C is a waveform derived at junction 42 of FIG. 1.

Transistors 26 and 27 and their associated elements form a trigger stage from which the output of the device is taken at junction 42 through coupling capacitor 28 at terminal 29. The emitters 30 and 31 of those transistors are connected through a common resistor 32 to a source of positive potential impressed at terminal 33. The collectors 34 and 35 of transistors 26 and 27 are connected through resistors 36 and 37 to the terminal 15 at which the source of negative potential is impressed, the terminal 15 being convenient for that purpose, which reversely biases the collectors of those transistors. Base 38 of transistor 26 is directly coupled to collector 13 of normally "off" transistor 1 and base 39 of transistor 27 is directly coupled to collector 16 of the normally "on" transistor 2. In the trigger stage, therefore, transistor 26 is normally forwardly biased to conduction while transistor 27 is cut-off. That is, at time $t_0$, FIG. 2, transistor 26 is conducting in saturation while transistor 27 is cut-off. The initial state of the trigger stage is determined by conditions existing in the first stage at time $t_0$. This can be more readily appreciated by considering that because transistor 1 is cut-off at time $t_0$, the voltage at its collector 13 is the voltage impressed at terminal 15 reduced by the drop due to the base current of transistor 26 and the collector leakage current which flow through resistor 14, that voltage being directly coupled to base 38. The forward bias on transistor 26 is then the difference between the negative potential at collector 13 and the potential at the emitter 30. Transistor 2, on the other hand, is conducting the $I_{BIAS}$ current, so that the voltage at its collector 16 and junction 25 is more positive to the extent of the voltage drop caused by the collector current flowing through resistor 17. Base 39 is directly coupled to collector 16 at the junction 25 and the potential at that collector is sufficiently positive with respect to emitter 31 to bias base 39 reversely so that transistor 31 is cut-off. Hence, the initial state of the trigger circuit is such that transistor 27 is cut-off and transistor 26 is conducting a saturation current. At time $t_2$ when the ramp voltage is equal to the reference voltage, the sudden diversion of half the $I_{BIAS}$ current to transistor 1 causes a rise in voltage at its collector 13 while a corresponding drop in voltage ensues at collector 16 due to the decrease in current, as indicated by the waveform of FIG. 2B. The base of transistor 27, because it is directly coupled to emitter 16, tends to become biased in the forward direction whereas the base of transistor 26 tends to become reversely biased. As soon as transistor 27 commences to conduct, the voltage at its collector rises, this rise in voltage being coupled through capacitor 40 to base 38, so that a regenerative effect occurs which quickly causes transistor 26 to be cut off and transistor 27 to be biased to conduct a saturation current. This switching action of the trigger circuit is extremely rapid and a reversal of its initial state occurs in a short time. The output, derived from the collector of transistor 27, is a negative going wave having a steep wave front 41 as indicated in FIG. 2C. The negative going wave, at junction 42, is coupled through the D.C. blocking capacitor 28 to output terminal 29. The negative going wave may be differentiated by conventional means and the differentiated pulse obtained may be used as a trigger to actuate other circuits, the particular use to be made of the trigger pulse being beyond the scope of this invention.

At time $t_3$, when the ramp voltage is being returned to the positive voltage level 22, the first stage and the trigger stage are caused to reassume their initial conditions, that is, the condition where the $I_{BIAS}$ current flows through transistor 2, saturation current flows in transistor 30, and transistors 1 and 31 are cut-off. The device is then ready for the next cycle of operation which commences when the sweep generator again furnishes a ramp voltage. Where the invention is employed in a digital voltmeter, it is contemplated that a ramp voltage will be repetitively generated at periodic intervals.

The direct coupling of the base of transistor 26 to the collector of transistor 1 and the similar direct coupling between transistors 27 and 2 is an important consideration in the invention because this arrangement results in improved circuit stability over a relatively large temperature range and permits the use of unselected transistors. That is, it is not necessary that the transistors be selected for their leakage current ($I_{co}$) characteristics but the directly coupled transistors should not have radically different characteristics or employ greatly different resistance values. The strong leakage current cancellation occurring in directly coupled transistors which form similar stages can be appreciated by considering that the leakage current ($I_{co}$) flowing from the base to the collector of transistor 1 flows directly into the base of transistor 26 and to the collector of that transistor so that no $I_{co}$ current enters any of the circuit resistances in the stage formed by transistor 1. That is, one may imagine a fictitious current generator connected between base 18 and collector 13 of transistor 1 and a similar current generator connected between the base and collector of transistor 26, those two current generators supplying the $I_{co}$ currents required. The current out of $I_{co}$ generator of transistor 1 flows into the $I_{co}$ generator of transistor 26 so that no $I_{co}$ current is drawn through any resistor associated with the transistor 1 if the $I_{co}$ currents generated by both are equal. Hence the stability of the directly coupled transistors is improved by the cancellation of the $I_{co}$ currents.

While the preferred embodiment of the invention has been described, it is to be understood that modifications which do not depart from the essence of the invention can be made and, indeed are apparent to those knowledgeable in electronics. For example, N-P-N, surface barrier, or other types of transistors may be substituted for the P-N-P transistors illustrated and the bias voltages arranged to accord with the use of those other types. It is also apparent that an output signal may be derived from the collector 34 of transistor 26. In the trigger stage, as a further example, feedback from one transistor to the other may be accomplished by other arrangements. Therefore, it is intended that the scope of the invention not be limited to the precise embodiment disclosed herein, but rather, that the invention be construed in accordance with the appended claims.

What is claimed is:

1. An electronic device for producing an output signal indicative of a predetermined relationship between the amplitude of a first input signal and a reference voltage comprising, a constant current generator, a pair of current amplifying elements, means for applying said first input signal and said reference voltage separately to different ones of said elements to cause the constant current of said generator to flow into one of said elements when said input signal bears other than said predetermined relationship to said reference voltage and for diverting a part of said current to the other of said elements upon the occurrence of said predetermined relationship, and a trigger circuit responsive to a change in current at the outputs of said elements whereby the diversion of said constant current causes actuation of said trigger circuit.

2. An electronic comparator comprising, a generator for supplying a constant current, a pair of semiconductor current amplifying elements connected to the constant current output of said generator, means including a source of reference voltage for biasing said elements to cause said constant current to flow into one of said elements, said means further including a signal source for diverting a part of said constant current to the other of said elements when the signal from said source bears a predetermined voltage relationship to said reference voltage, a pair of load impedances, each of said elements having its output connected to a different one of said load impedances, and a trigger circuit responsive to a change in current at the outputs of said elements whereby the diversion of said constant current from one of said elements to the other causes actuation of said trigger circuit.

3. A voltage comparator comprising, a constant current generator, a pair of semiconductor amplifying elements connected to the constant current output of said generator, a signal source connected to one of said amplifying elements, a reference voltage source connected to the other of said amplifying elements, said signal source and said reference source biasing said elements to cause the constant current output of said generator to flow into one of said elements, said signal source being adapted to furnish a varying voltage signal whereby a part of said constant current output is diverted to the other of said elements when the amplitude of said varying signal is equal to the voltage of said reference source, a trigger circuit having a pair of semiconductor amplifying devices, and each of said devices being directly coupled to a different one of said elements to provide cancellation of leakage currents.

4. A voltage comparator comprising, a source of constant current, first and second transistors having their emitters coupled to said current source, a signal source coupled to the base of said first transistor, a source of reference potential coupled to the base of said second transistor, impedance means connecting the collectors of said first and second transistors to a source of biasing voltage, third and fourth transistors forming a trigger stage, the base of said third transistor being directly coupled to the collector of said first transistor, the base of said fourth transistor being directly coupled to the collector of said second transistor, a regenerative coupling means between said third and fourth transistors, and means connecting the emitters and collectors of said third and fourth transistors to said source of biasing voltage.

References Cited in the file of this patent

UNITED STATES PATENTS

| | | |
|---|---|---|
| 2,772,359 | Modiano | Nov. 27, 1956 |
| 2,831,986 | Sumner | Apr. 22, 1958 |
| 2,846,594 | Pankratz | Aug. 5, 1958 |
| 2,903,605 | Barney et al. | Sept. 8, 1959 |
| 2,909,676 | Thomas | Oct. 20, 1959 |
| 2,909,678 | Jensen | Oct. 20, 1959 |
| 2,920,215 | Lo | Jan. 5, 1960 |
| 2,933,623 | Jones | Apr. 19, 1960 |

FOREIGN PATENTS

| | | |
|---|---|---|
| 753,689 | Great Britain | July 25, 1956 |

OTHER REFERENCES

"Transistor Circuit Engineering," by Shea, 1957, published by Wiley & Sons, New York, page 152.